United States Patent [19]
Grosseau

[11] 3,868,129
[45] Feb. 25, 1975

[54] VEHICLE SUSPENSIONS
[75] Inventor: Albert Grosseau, Chaville, France
[73] Assignee: Societe Anonyme Automobile Citroen, Paris, France
[22] Filed: May 22, 1973
[21] Appl. No.: 362,667

[30] Foreign Application Priority Data
June 1, 1972 France .................. 72.19739

[52] U.S. Cl.... 280/106.5 R, 280/124 A, 267/57.1 R
[51] Int. Cl. ............................... B60g 11/60
[58] Field of Search .. 280/106.5 R, 106.5 A, 124 R, 280/124 A, 124 B; 267/57, 57.1 R, 57.1 A, 63 R, 63 A

[56] References Cited
UNITED STATES PATENTS

| | | | |
|---|---|---|---|
| 2,202,615 | 5/1940 | Barenyi | 267/63 A |
| 3,589,700 | 6/1971 | Ruet | 267/57 |
| 3,594,017 | 7/1971 | Grosseau | 280/124 R |
| 3,642,302 | 2/1972 | Hickman | 280/124 |
| 3,692,326 | 9/1972 | Hickman | 280/124 R |

*Primary Examiner*—Philip Goodman
*Assistant Examiner*—John A. Carroll
*Attorney, Agent, or Firm*—Stevens, Davis, Miller & Mosher

[57] ABSTRACT

The suspension comprises at least one pivoted wheel arm, in line with a rigid hollow element belonging to the structure of the vehicle. The wheel arm is pivoted on an axle borne by said hollow element, the wheel arm being fast in rotation to a rigid member adapted to cooperate with elastic stops housed in the hollow element. The pivoting axle of the wheel arm has its geometrical axis situated outside the rigid hollow element and the latter comprises an opening in its wall adapted to be traversed by said rigid member, which member constitutes a radial extension of the arm intended to project inside the hollow element between the elastic stops. The suspension is particularly useful for passenger automobile vehicles.

11 Claims, 7 Drawing Figures

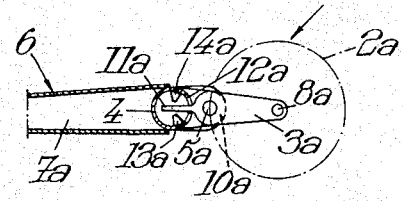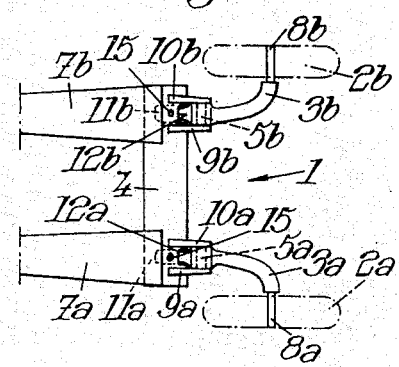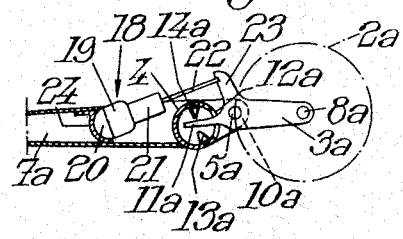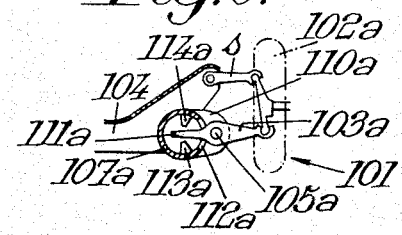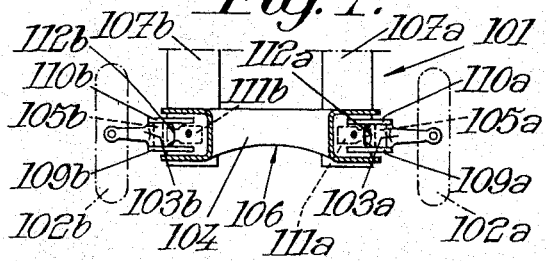

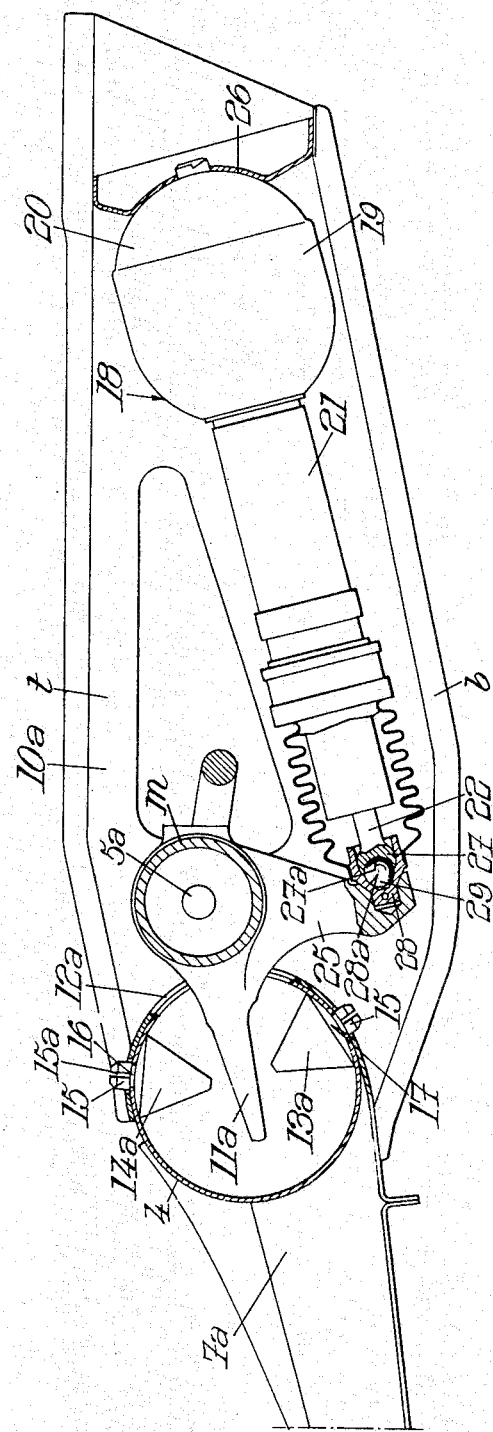

VEHICLE SUSPENSIONS

The invention relates to improvements in or to suspensions for vehicle wheels of the type which comprise at least one pivoted wheel arm, close to a rigid hollow element belonging to the structure (chassis or body) of the vehicle, on a pivoting axis borne by said hollow element, the wheel arm being fast in rotation to a rigid member adapted to cooperate, to control the movements of said arm, with elastic stops housed in the hollow element.

The invention relates more particularly, because it is in this case that its application seems to offer the most advantage, but not exclusively, to suspensions for automobile vehicles, especially passenger vehicles.

It is a particular object of the invention to render suspensions of the type concerned such that they respond to the various exigencies of practice better than hitherto, and especially such that they form a simple and compact assembly.

According to the invention, a suspension for a vehicle wheel, of the previously defined type, is characterised by the fact that the geometric pivoting axis of the wheel arm is situated on the outside of the rigid hollow element, and that the latter comprises, in its wall, an opening adapted to be traversed by said rigid member, which member constitutes a radial extension of the arm intended to project inside the hollow element between the elastic stops.

When it relates to a suspension in which the hollow element is constituted by a tubular traverse, the wheel arm is oriented in the longitudinal direction of the vehicle and the abovesaid radial extension is constituted by a pallet situated at the pivoted end of the arm and introduced into the traverse.

When it relates to a suspension in which the hollow element is constituted by a tubular longitudinal member, the wheel arm is oriented transversely with respect to the vehicle and the abovesaid radial extension is constituted by a pallet situated at the articulated end of the arm and introduced into the longitudinal member.

Preferably, the tubular hollow element is of circular perpendicular cross-section, and the opening provided in the wall of this hollow element is constituted by a window extending along a circular arc, the pivoting axis of the wheel arm being borne by two flanges fixed rigidly to the hollow element, situated on both sides of the window and of which the planes are perpendicular to the axis of said hollow element.

The invention consists, apart from the features mentioned above, of certain features which will be more explicitly considered below, with regard to embodiments of the invention which will be described in more detailed manner, with reference to the accompanying drawings, but which are in no way limiting.

FIG. 1 of these drawings is a partial and diagrammatic view, in section and in elevation, of a suspension, for vehicle rear wheels, according to the invention.

FIG. 2 is a plan view, of the suspension of FIG. 1.

FIG. 3 shows a modification of the suspension of FIG. 1.

FIG. 4 shows, partially, in elevation and in section on a larger scale, another modification of the suspension of FIG. 1.

FIG. 6 shows diagrammatically in section, a suspension according to the invention for vehicle front wheels.

Figure 5:
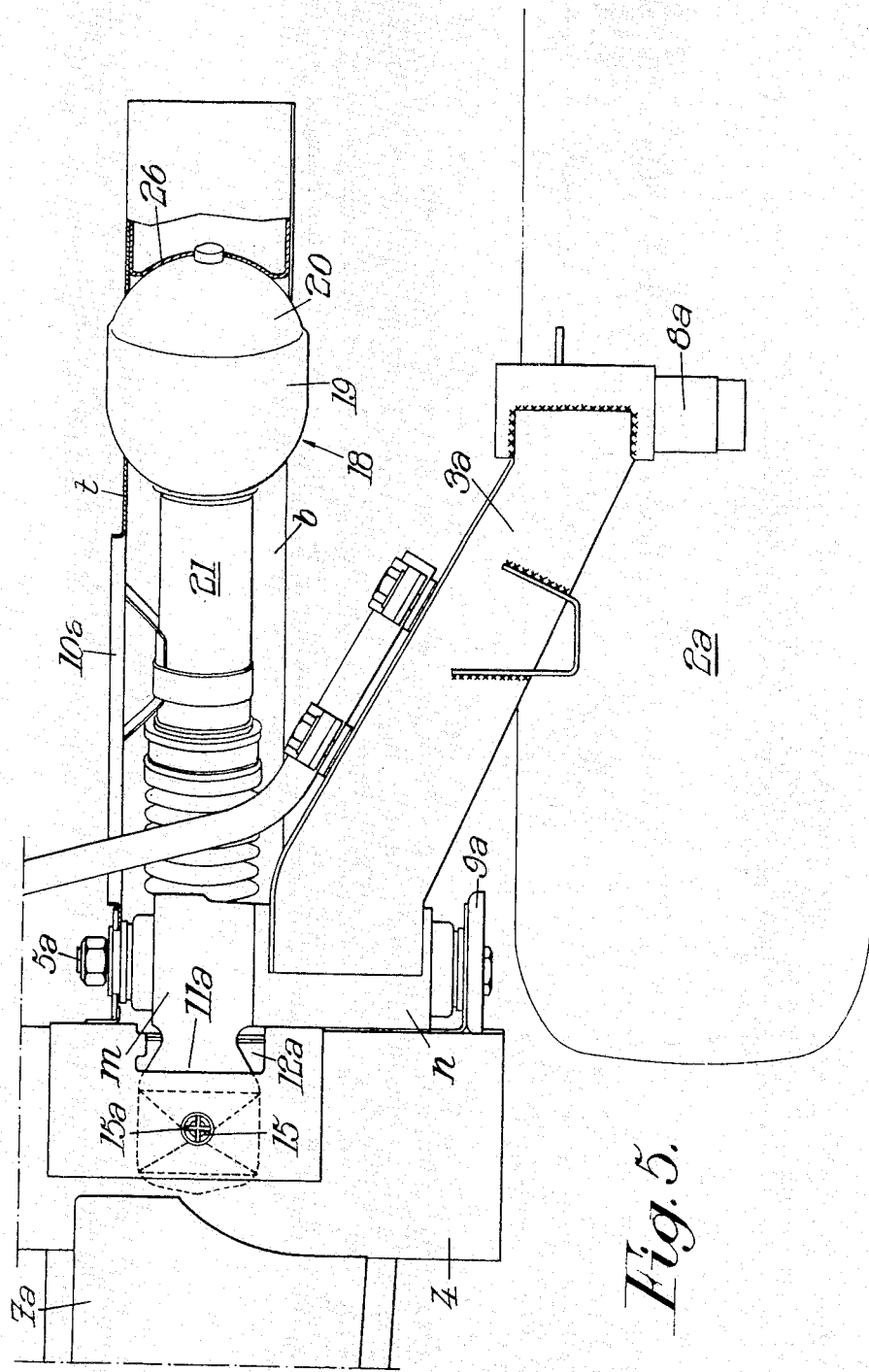
FIG. 5 is a plan view of the suspension of FIG. 4.

FIG. 7 lastly is a plan view of the suspension of FIG. 6.

Referring to FIGS. 1 and 2, there can be seen a suspension 1 for rear wheels 2a, 2b of an automobile vehicle. This suspension comprises, on each side of the vehicle, a wheel arm 3a, 3b associated with the rear wheel 2a, 2b situated on the same side.

Each wheel arm 3a, 3b is articulated, in line with a rigid hollow element 4, on pivoting means constituted, respectively, by an axle 5a, 5b outside the hollow element 4 and borne by the latter.

This hollow element 4 belongs to the structure of the vehicle, constituted by a chassis 6, and it is arranged in the form of a tubular traverse, for example with a circular perpendicular cross-section. This traverse 4 is perpendicular to the longitudinal axis of the vehicle and it is fixed rigidly to two longitudinal members 7a, 7b of the chassis 6, for example by welding.

The arms 3a, 3b are oriented in the longitudinal direction of the vehicle, towards the rear of the traverse 4, and are bent, as seen in FIG. 2, so as to separate, towards the rear, from the longitudinal axis of the vehicle. Each arm bears an axle 8a, 8b, perpendicular to said longitudinal axis and on which is mounted the associated wheel 2a, 2b. The arms 3a, 3b are arranged respectively, in the vicinity of the ends of the traverse 4.

The pivoting axes 5a and 5b of the arms are borne, parallel to the traverse 4 and behind the latter, respectively by two flanges 9a, 10a and two flanges 9b, 10b substantially perpendicular to the traverse and fixed rigidly on the latter.

It is clear that the geometric pivoting axis of each arm, constituted by the line forming the geometrical axis of each material pivoting axle 5a, 5b and which extends on both sides of the material axle, is situated outside the traverse 4.

Each arm 3a, 3b is fast in rotation to a rigid member 11a, 11b constituted by a pallet extending forwardly, as seen in FIGS. 1 and 2, the pivoted end of the associated arm.

Each pallet 11a, 11b constitutes a radial extension of the associated arm 3a, 3b, that is to say an extension in an average direction at right angles to the geometrical axis of the pivot of this arm.

The traverse 4 comprises, in its wall, two openings 12a, 12b constituted by windows oriented towards the rear of the vehicle, extending along a circular arc of about 90° and comprised, respectively, between the flanges 9a, 10a and 9b, 10b. Each pallet 11a, 11b passes through the associated window 12a, 12b to project inside the traverse 4.

Elastic stops 13a, 14a and 13b, 14b are provided inside the said traverse 4 to cooperate respectively with the pallets 11a and 11b so as to limit the amplitude of the angular movements of the arm fast to the pallet.

It will be noted that the windows 12a, 12b enable, if necessary, the mounting of the elastic stops inside the traverse 4.

As seen on a larger scale in FIG. 4, the stops such as 13a, 14a may be realized in the form of frustoconic blocks of elastomeric material whose point is turned towards the axis of the traverse 4. On a large base of each stop, a tit 15 of elastomeric material is provided for the fixing of the stop on the traverse 4. This tit 15 is connected to the stop by a zone of smaller diameter so that a groove 16 is formed between the tit and the large base of the stop. Holes 17, of a diameter substantially equal to that of the groove 16, are pierced in the wall of the traverse 4 on each side, along the circumference, of the neighboring window such as 12a, to enable the fixing of the elastic stops by the forced introduction of the elastic tit 15 into a hole 17 so that the wall bordering the hole 17 becomes lodged in the groove 16.

The tit 15 comprises a cross-shaped slot 15a (FIG. 5) to facilitate its deformation.

The elastic stops, such as 13a, 14a, situated on each side of a same pallet such as 11a, are substantially symmetrical with respect to one another relative to a mean position of the pallet.

These elastic stops 13a, 14a may serve as elastic suspending members. In this case, the stops are sufficiently close to one another to be simultaneously in contact with the pallet 11a in the mean position of the arm 3a.

However, in the case of the embodiment shown in the drawings, the elastic stops are only intended to come into action on considerable movements of the arms 3a, 3b. Also as seen especially in FIG. 1, the elastic stops are separated from the pallet. The suspension is then completed by any conventional mechanical or fluid spring.

In the embodiments of FIGS. 3, 4 and 5, the suspension is completed by a fluid spring 18 of the oleopneumatic device type acting at the same time as a mechanical spring and as a damper.

The oleo-pneumatuc device 18 comprises, in manner known in itself, a metallic reservoir 19, ending on one side at a hemispherical dome 20 and extended on the opposite side by a cylinder 21 in which is adapted to slide a piston whose rod 22 projects outside the cylinder 21.

In the case of FIG. 3, each wheel arm such as 3a comprises an extension 23 substantially perpendicular to the pallet 11a and oriented outwardly. The oleopneumatic device 18 is arranged in front of the articulation axis 5a. The hemispherical bottom 20 of the reservoir 19 is turned forwardly and is supported against a part 24 in the form of a cup, mounted in the longitudinal member 7a of the chassis associated with the arm concerned.

The rod 22 of the piston of the oleo-pneumatic device 18 is pivoted, at its end distant from the hemispherical bottom 20, on the end of the extension 23 distant from the axle 5a.

In the case of FIGS. 4 and 5, the pallet 11a is fast to an extension 25 oriented downwardly. The oleopneumatic device 18 is arranged behind the pivoting axle 5a and the hemispherical bottom 20 of the reservoir 19 is turned rearwardly and becomes supported against a part 26 in the form of a cup. One of the flanges bearing the pivoting axle 5a, for example the inner flange 10a, is extended rearwardly in order that the part 26 may be fixed on this flange. As seen in FIGS. 4 and 5, the extended flange 10a is constituted by a sheet metal plate t whose plane is substantially vertical, the lower edge b of this sheet metal being folded at 90°, with respect to the plane of the sheet metal, on the opposite side to the longitudinal axis of the vehicle, so as to constitute a rigidifying rib of the flange 10a.

The pivoting of the rod 22 on the extension 25 is effected by means of a spherical ball and socket joint 27 provided at the end of the rod 22 and adapted to cooperate with a complementary housing provided in a support part 28 mounted at the end of the extension 25. A ball 29 is arranged between two concave spherical surfaces 28a, 27a, provided respectively in the support part 28 and in the ball joint 27.

As will be clear from FIG. 5, the pallet 11a is displaced, transversely, with respect to the arm 3a, but is fast in rotation with the latter. The pallet 11a has a substantially rectangular shape and it is fast to a sleeve m constituting the extension of a sleeve n fast to the arm 3a. These two sleeves are coaxial, connected in rotation to one another, and mounted, for example by means of needle bearings, free in rotation on the axle 5a.

FIGS. 6 and 7 show a suspension 101 according to the invention, for front wheels 102a, 102b of an automobile vehicle. The elements of this suspension playing the roles analogous to the elements already described will be denoted by reference numbers equal to the sum of the reference number of the element described previously and the number 100.

The rigid hollow element, of the chassis 106, in which are housed the elastic stops such as 113a, 114a, is constituted, for each front wheel 102a, 102b, by a tubular longitudinal member 107a, 107b.

The suspension arms of the wheels are constituted by lateral arms 103a, 103b oriented perpendicularly to the longitudinal axis of the vehicle. These arms are articulated on axles 105a, 105b, borne by the transverse flanges 109a, 110a and 109b, 110b. The transverse wheel arms are extended, inside the tubular longitudinal members, by pallets 111a, 111b, which traverse the windows 112a, 112b, provided on the outer longitudinal portion of the wall of the longitudinal members. The elastic stops such as 113a, 114a are housed in the longitudinal members so as to cooperate with the pallets to control the movements of the front wheels.

The longitudinal members are united by a traverse member 104 in the form of a cradle and an upper transverse arm s, substantially parallel to the arm 103a (FIG. 6), is provided to contribute to the holding of the wheel 102a. It is the same for the wheel 102b.

As for the suspension of the rear wheels described previously, the elastic suspension members are constituted by the elastic stops themselves or by a conventional mechanical or fluid spring, not shown in FIGS. 6 and 7.

Whatever the embodiment adopted, there is obtained a suspension of small bulk, both in the longitudinal direction and in the transverse direction, due to the utilization of a hollow element in the wall of which are provided windows for the passage of the pallet fast in rotation to the wheel arm.

The weight and cost of this suspension are relatively low by reason of the small size and absence of supplementary stop supports.

In addition, the said suspension has good endurance since the internal forces of the chassis, between the articulation of the wheel arm and the support points of the elastic members, spring or stop, are localized in a rather narrow and particularly strong zone.

I claim:

1. Wheel suspension means for a vehicle having a rigid structure, comprising
    a rigid hollow element connected with the vehicle structure, said hollow element including a wall portion containing an opening;

a pivot axle connected in parallel laterally spaced relation relative to said hollow element and opposite said opening;

a wheel arm pivotally connected with said axle, said wheel arm being adapted to rotatably support at a location remote from said pivot axle a wheel of the vehicle;

a first rigid projection connected with said wheel arm and extending radially relative to said pivot axle into said opening; and a pair of elastic stop members mounted within said rigid hollow element on opposite sides of said rigid projection, respectively, said stop members being contained in a plane normal to the plane of said pivot axle, whereby upon pivotal movement of said wheel arm, said rigid projection is brought into contact with at least one of said elastic stop members.

2. Apparatus as defined in claim 1, wherein said hollow element comprises a tubular traverse member which extends transversely of the vehicle structure, said wheel arm extending longitudinally of the vehicle and being pivotally connected at one end with said pivot axle, said first rigid projection comprising a pallet extending from said one end of said wheel arm into said opening.

3. Apparatus as defined in claim 1, wherein said rigid hollow element comprises a tubular longitudinal member which extends longitudinally of the vehicle, said wheel arm extending transversely of the vehicle and being pivotally connected at one end with said pivot axle, said first rigid projection comprising a pallet extending from said one end of said wheel arm into said opening.

4. Apparatus as defined in claim 1, wherein said rigid hollow element is tubular and has a circular cross-section, the opening contained in the wall portion of said hollow element comprising a window extending along a circular arc.

5. Apparatus as defined in claim 1, and further including a pair of flanges arranged on opposite sides of said opening for connecting the ends of said pivot axle in spaced relation relative to said hollow element, said flanges being substantially normal to said hollow element.

6. Apparatus as defined in claim 1, wherein each of said elastic stop members comprises a frustoconical block formed of elastomeric material, the pointed portions of said stop members extending in the direction of said first projection, said stop members having at least one tit on the large base portion thereof that extends through a corresponding aperture contained in the wall portion of said rigid hollow element.

7. Apparatus as defined in claim 1, and further including a second projection connected with said wheel arm and extending radially from said pivot axle, and further including resilient means connected between said second projection and said vehicle structure for resisting pivotal movement of said wheel arm, said elastic stop members normally being slightly spaced from said first projection, whereby said first projection will engage said elastic stop members only upon substantial pivotal movement of said wheel arm.

8. Apparatus as defined in claim 7, wherein said second projection is generally normal to said first projection.

9. Apparatus as defined in claim 7, wherein said resilient means comprises a fluid spring of the oleo-pneumatic type.

10. Apparatus as defined in claim 2, and further including a second projection on said wheel arm extending radially from said pivot axle, resilient means connected between said second projection and said vehicle structure, said elastic stop members being spaced from said first projection so that said first projection engages said stop members only upon substantial pivot movement of said wheel arm, said resilient means comprising a fluid spring of the oleo-pneumatic type arranged longitudinally of the vehicle on the opposite side of the pivot axle from the portion of said wheel arm that is adapted for connection with the wheel, said fluid spring terminating at its end remote from said second projection in a rounded dome portion, and a cup secured to said vehicle structure for receiving said dome portion.

11. Apparatus as defined in claim 2, and further including a second projection on said wheel arm extending radially from said pivot axle, resilient means connected between said second projection and said vehicle structure, said elastic stop members being spaced from said first projection so that said first projection engages said stop members only upon substantial pivot movement of said wheel arm, said resilient means comprising a fluid spring of the oleo-pneumatic type arranged longitudinally of the vehicle on the same side of the pivot axle as the portion of the wheel arm that is adapted for connection with the wheel, said fluid spring terminating at its end remote from said second projection in a rounded dome portion, and a cup secured to said vehicle structure for receiving said dome portion.

* * * * *